United States Patent [19]

Ilenda

[11] 4,180,632

[45] Dec. 25, 1979

[54] POLYAMINOESTERS AND FOAMS MADE THEREFROM

[75] Inventor: Casmir S. Ilenda, Croydon, Pa.

[73] Assignee: Rohm and Haas Company, Philadelphia, Pa.

[21] Appl. No.: 855,102

[22] Filed: Nov. 25, 1977

[51] Int. Cl.² .............................................. C08J 9/00
[52] U.S. Cl. ..................................... 521/184; 528/363; 528/392
[58] Field of Search ................... 526/11.1; 260/2.5 N; 528/363, 392; 521/184

[56] References Cited

U.S. PATENT DOCUMENTS

| | | | |
|---|---|---|---|
| 3,845,056 | 10/1974 | Robson et al. | 260/268 R |
| 3,859,251 | 1/1975 | Kuhfuss et al. | 260/2.5 N |
| 4,026,828 | 5/1977 | Smiley | 260/2.5 N |
| 4,070,426 | 1/1978 | Purvis | 260/2.5 N |

*Primary Examiner*—Morton Foelak
*Attorney, Agent, or Firm*—Michael B. Fein

[57] ABSTRACT

Rigid thermoset polyaminoesters are prepared by reacting a mixture of acrylate monomer having an average acrylate functionality of at least 2.5 and aliphatic amine having an average amine hydrogen functionality of at least 3.

18 Claims, No Drawings

POLYAMINOESTERS AND FOAMS MADE THEREFROM

BACKGROUND OF THE INVENTION

This invention relates to high performance thermoset plastics and processes for production thereof.

More particularly, it relates to a novel composition suitable for rapid production of molded plastic articles via the reaction injection molding ("RIM") or liquid injection molding ("LIM") processes wherein a liquid reaction mixture is introduced into a mold, especially a closed injection mold, and is rapidly polymerized to a rigid thermoset plastic.

The only plastics previously used successfully in the RIM or LIM processes have been low modulus, low DTUFL polyurethanes; no one has ever suggested polyaminoesters which are prepared from amines and acrylates for these processes. Polyaminoesters have previously been suggested mainly for coatings (U.S. Pat. No. 3,845,056 to Robson et al.); coatings and films (U.S. Pat. No. 2,759,913 to Hulse), or gel-like products.

There is a need for high modulus, high DTUFL plastics moldable by the RIM or LIM process.

It is an object of the present invention to provide compositions which are suitable for rapid polymerization to rigid, hard, high use temperature thermoset polymers.

Another object is to provide a rapid process for molding such compositions.

A still further object is to provide novel thermoset polymers with an exceptional balance of properties.

An additional object is to provide articles molded from the novel compositions via the novel processes.

These objects and others as will become apparent from the following description are achieved by the present invention which comprises a mixture of acrylate monomer having an average acrylate functionality of at least 2.5 and aliphatic amine having an average amine hydrogen functionality of at least 3; processes of preparing rigid thermoset polymers comprising introducing said mixture in a mold and allowing it to react; the resultant solid polyaminoester polymers; and articles prepared by the processes.

DETAILED DESCRIPTION OF THE INVENTION AND THE PREFERRED EMBODIMENTS

In accordance with the invention, the acrylate monomer and aliphatic amine react rapidly via a Michael-type reaction, either primarily or exclusively, to a final rigid thermoset polymer product having a high softening temperature.

The acrylate monomer or mixture of acrylate monomers used are those having an average acrylate functionality of at least about 2.5. The acrylates can be the product of partial or total acrylation of triols, tetrols, or higher polyols, or mixtures of these tri- and higher functional acrylates with diacrylates. Examples of suitable tri- and higher functional acrylates are trimethylolpropane triacrylate, pentaerythritol tetraacrylate or triacrylate, glycerol triacrylate, and the like. Diacrylates which can be used in admixture therewith include 2,2-dimethylpropylene glycol diacrylate, ethylene glycol diacrylate and the like. The acrylates or mixtures thereof are all liquid at or near room temperature, preferably. Methacrylates are not suitable.

The low molecular weight aliphatic amines which are useful have an average amine hydrogen functionality of at least about 3. By "aliphatic" is meant amines whose nitrogen is attached to an aliphatic carbon, but is not meant to exclude amines which also contain aromatic or cycloaliphatic moieties. By "low molecular weight" is meant number average molecular weight of below about 1000, preferably below about 600. The equivalent weight of the aliphatic amines is preferably below about 100. For example, ethylene diamine, diethylenetriamine, triethylene tetramine, tetraethylene pentamine, propylenediamine, polyethyleneimine, diaminohexane, aminoethylpiperazine, 1,4-(diaminomethyl) cyclohexane, and m-xylylenediamine are suitable, either alone or in admixture with other aliphatic amines. The preferred amines are of the formula $H_2N(CH_2CH_2NH)_nH$ wherein n is 1 to 4. The amines or mixtures thereof are preferably liquids at or near room temperature.

Suitable ratios of acrylate to amine, on an equivalents basis based on acrylate and amine hydrogen functionality, are about 0.5 to about 2.0.

Optionally, small amounts of free radical initiator can be used. Suitable initiators are generally of the peroxide or azo class such as those normally used for free radical polymerization. For example, di-t-butyl peroxide, azoisobutyryl nitrile, and the like can be used in amounts of about 0.01 to 0.5 percent by weight based on reactants. When the initiator is used it causes free radical polymerization of the excess acrylate.

When no initiator is used, the preferred acrylate to amine hydrogen equivalents ratio is about 0.5 to 1.09. When the initiator option is followed, the preferred acrylate to amine hydrogen equivalents ratio is about 0.8 to 2.0.

Optionally, one or more ethylenically unsaturated monomers other than acrylates which are copolymerizable with acrylates but are less reactive with amines than are the acrylates in the composition can be included. For example, styrene and methyl methacrylate can be used in minor amounts, preferably less than about 15% by weight based on reactants. When these other ethylenically unsaturated monomers are used, the initiator should also be used. When these other monomers are used, they copolymerize with the excess acrylate groups.

The compositions and articles produced have a wide variety of end uses, including electrical insulator parts, distributor caps, gears, fenders, boat hulls, foams, and sheet, due to their excellent balance of properties, especially with regard to their rapid moldability, their rigidity and their high use temperature, and their hardness. For some end uses it is preferable to incorporate additives such as glass or asbestos fiber reinforcement, inert particulate filler, dyes, pigments, UV light and other stabilizers, flame retardants, mold release agents, etc. Suitable amounts of glass or other fibrous reinforcement are about 5 to 50% by weight. Suitable amounts of inert particulate filler are about 5 to 75% by weight.

In accordance with the process aspect of this invention, the acrylate monomer, the amine monomer, optionally the ethylenically unsaturated monomer other than acrylates and free radical initiator, and the optional additives are mixed and introduced to a mold, preferably a closed mold, and allowed to react for about 1 to 2000 seconds at a mold temperature of about 0° to 200° C., preferably about 20° to 120° C. The preferred molding system is a closed mold, usually an injection mold. Only very low pressures and temperatures are required, usually only about 20 psi and 50° C., to quickly mold the high softening temperature articles of the invention, contrary to normal thermoplastic injection molding which requires high temperatures, usually about 200°–300° C., and pressures, usually about 10,000 to 50,000 psi, because of the high viscosity of the polymer melt. With other thermoset systems, high pressures and temperatures are needed because of the viscosity and reaction temperatures of those materials. No solvents are needed, and preferably none are used in the process.

The process of this invention is very interesting because moldings of outstanding properties can be quickly and efficiently made at low temperatures and pressures in a low cost mold, somewhat similar to polyurethanes but with quite different chemistry and properties.

Foams can also be made by the process by including a low boiling inert solvent which boils under the reaction conditions so as to produce rigid foamed articles.

The following non-limiting examples are presented to illustrate a few embodiments of the invention. All parts and percentages are by weight unless otherwise indicated.

The following procedures are used to measure the properties in the examples:
 ASTM D638—tensile strength and modulus
 ASTM D790—flexural strength and modulus
 ASTM D256—notched Izod impact strength
 ASTM D648—DTUFL (deflection temperature under flexural load)
 ASTM D785—Rockwell hardness
 ASTM D1525—Vicat softening point The 10 mil deflection temperature test is similar to ASTM D1525. The Vicat apparatus is used but the measurement is begun at −20° C. and run to 10 mil identation.

Acrylate equivalent weights are measured by the pyridine sulfate dibromide technique:
 trimethylolpropane triacrylate (TMPTA) = 111
 pentaerythritol triacrylate (PETA) = 108
 neopentylglycol diacrylate (NPGDA) = 127
 ethylene diacrylate, electrophoresis = 87 grade Examples 1–9 illustrate the effect of acrylate-amine ratio on the gel time and properties of TMPTA-TEPA polyaminoesters.

EXAMPLE 1

Tetraethylenepentamine (38.22 parts) and trimethylolpropane triacrylate (130.0 parts) are mixed with a glass stirring rod at room temperature. After the components are mixed for about 10 seconds, they form a homogeneous solution which becomes warm. The solution is then poured between two glass plates 0.4 cm. apart. The solution gels in two minutes. The sheet is removed from the mold after 10 minutes. It is postcured by heating to 180° C. over a 2 hour period. The physical properties are summarized in Table 1. The polyaminoester shows less than 0.5% change in weight and dimensions during immersion in gasoline for 8 days.

EXAMPLES 2A–9

Trimethylolpropane triacrylate-tetraethylenepentamine polyaminoester sheets of various compositions are cast by the procedure in Example 1. The gel times and properties are listed in Table 1. At equivalent ratios less than 0.5, the tensile strength and modulus are too low for a useful plastic. At equivalent ratios greater than 2.0, as in comparative Example 9, the tensile strength and modulus is too low for a useful plastic and the gel times are too long for RIM processing.

TABLE 1

| Ex. | Equivalents Ratio Acrylate/Amine | Gel Time (minutes) | Tensile Strength (psi) | Tensile Modulus (psi) | DTUFL At 264 psi (°C.) | Vicat (°C.) | Rockwell Hardness |
|---|---|---|---|---|---|---|---|
| 2A | 0.54 | <1 | 4700 | 140,000 | 50 | 150 | M50 |
| 2B | 0.64 | <1 | 6600 | 290,000 | 50 | 180 | M50 |
| 2C | 0.74 | 1 | 8600 | 360,000 | 50 | 190 | M50 |
| 2D | 0.78 | 1 | 7400 | 360,000 | 50 | 210 | M50 |
| 1 | 0.83 | 2 | 7200 | 330,000 | 50 | 210 | M40 |
| 2E | 0.88 | 2 | 6900 | 340,000 | 50 | 210 | M30 |
| 3 | 0.92 | 2 | 6300 | 300,000 | 40 | 210 | M30 |
| 4 | 1.00 | 3 | 4100 | 190,000 | 40 | 210 | M0 |
| 5 | 1.08 | 4 | 2400 | 95,000 | 40 | 210 | M0 |
| 6 | 1.3 | 10 | | 75,000 | | | |
| 7 | 1.6 | 25 | | 40,000 | | | |
| 8 | 1.9 | 90 | | 20,000 | | | |
| 9 comparative | 2.2 | 150 | | <10,000 | | | |

Examples 1, 10, and 11 illustrate the effect of reaction temperature on mold time.

EXAMPLE 10

The procedure of Example 1 is repeated with the exception that the reagents are equilibrated at 0° C. before they are mixed. Gelation requires 5 minutes and the sheet is removed from the mold in 25 minutes.

EXAMPLE 11

When the reagents are equilibrated at 50° C. before they are mixed, gelation occurs in less than one minute and the sheet is removed from the mold in 5 minutes.

The properties of the plastics described in the above two Examples are essentially identical to the properties of the plastic as described in Example 1.

Examples 12–24 illustrate the effect of amine structure, acrylate structure, and component ratio.

EXAMPLE 12

TMPTA-DETA Polyaminoester

Diethylenetriamine (22 parts) and trimethylolpropane triacrylate (110 parts) are reacted at 0° C. as described in Example 1. Properties are listed in Table 2.

EXAMPLE 13

TMPTA-EDA Polyaminoester

Ethylenediamine (16.49 parts) and trimethylolpropane triacrylate (105.7 parts) are reacted at 0° C. as described in Example 1. Properties are listed in Table 2.

EXAMPLE 14

TMPTA-XDA Polyaminoester m-Xylylenediamine (34.1 parts) and trimethylolpropane triacrylate (105.8 parts) are reacted at 25° C. as described in Example 1. Properties are reported in Table 2.

EXAMPLE 14A

TMPTA-DAMC Polyaminoester 1,3-(Diaminomethyl)cyclohexane (30.5 parts) and trimethylolpropane triacrylate (91.4 parts) are reacted at 25° C. as described in Example 1. Properties are reported in Table 2.

EXAMPLE 14B

TMPTA-PEI Polyaminoester

This Example illustrates use of amines of higher molecular weight in the invention.

Polyethyleneimine (4.3 parts) and trimethylolpropane triacrylate (13.8 parts) are reacted at 25° C. as described in Example 1. Properties are reported in Table 2.

EXAMPLES 15-19

PETA-XDA Polyaminoester m-Xylylenediamine and pentaerythritol triacrylate in various ratios are reacted as in Example 1. The physical properties are shown in Table 2.

EXAMPLE 20

PETA-TEPA Polyaminoester

Tetraethylenepentamine and pentaerythritol triacrylate are reacted by the procedure of Example 1. The physical properties are shown in Table 2.

EXAMPLES 21-24

PETA-PDA Polyaminoester 1,2-Diaminopropane and pentaerythritol triacrylate are reacted as in Example 1. The properties are shown in Table 2.

is for 70 hours at 70° C. The properties measured are shown in Table 3.

EXAMPLES 28-29

1,2-Propylenediamine is reacted with trimethylolpropane triacrylate by the procedure of Examples 25-27. The properties are listed in Table 3.

EXAMPLES 30-33

Tetraethylenepentamine is reacted with neopentylglycol diacrylate (NPGDA) in various ratios and with trimethylolpropane triacrylate by the procedure of Example 1. The properties are shown in Table 3.

TABLE 3

| Example | Acrylate | Amine | Equiv. ratio Acrylate/Amine | Flexural Strength (psi) | Flexural Modulus (psi) | 10 Mil Penetration Temp (°C.) |
|---|---|---|---|---|---|---|
| 25* | EDA | PDA | 0.86 | 440 | 1600 | 8 |
| 26* | EDA | PDA | 0.93 | 390 | 1300 | 8 |
| 27* | EDA | PDA | 1.02 | 540 | 3000 | 20 |
| 28 | TMPTA | PDA | 0.84 | 13,600 | 300,000 | 165 |
| 29 | TMPTA | PDA | 1.00 | 8700 | 170,000 | 172 |
| 30* | NPGDA | TEPA | 0.79 | 290 | 2400 | −1 |
| 31* | NPGDA | TEPA | 0.86 | 260 | 2800 | −6 |
| 32* | NPGDA | TEPA | 0.92 | 260 | 2700 | −1 |
| 33 | TMPTA | TEPA | 0.82 | 11,400 | 300,000 | 195 |

*Comparative
The comparison shown in the Examples in Table 3 demonstrates the importance of the acrylate functionality.

Comparative Examples 34-36 illustrate that methacrylates, aromatic amines, and compounds with two amine hydrogens are unreactive and, therefore, inappropriate to the invention.

EXAMPLE 34

(Comparative)—Ethylenediamine (2.66 parts) is re-

TABLE 2

| Example | Acrylate | Amine | Equiv. ratio Acrylate/Amine | Gel time (Minutes) | Tensile Strength (psi) | Tensile Modulus (psi) | DTUFL @ 264 psi (°C.) | Vicat (°C.) | Rockwell Hardness |
|---|---|---|---|---|---|---|---|---|---|
| 12 | TMPTA | DETA | 0.93 | 1 (0° C.) | 6000 | 300,000 | 50 | 200 | M40 |
| 13 | TMPTA | EDA | 0.87 | 1 (0° C.) | 5400 | 270,000 | 40 | 200 | M10 |
| 14 | TMPTA | XDA | 0.95 | 60 | 8400 | 400,000 | 60 | 240 | M50 |
| 15 | PETA | XDA | 0.72 | 0.5 | — | — | 90 | — | — |
| 16 | PETA | XDA | 0.84 | 0.5 | 11,000 | 430,000 | 100 | 230 | M90 |
| 17 | PETA | XDA | 0.93 | 0.5 | 9600 | 430,000 | 100 | 230 | M90 |
| 18 | PETA | XDA | 1.01 | 1.0 | — | — | 100 | — | — |
| 19 | PETA | XDA | 1.12 | 1.0 | — | — | 70 | — | — |
| 20 | PETA | TEPA | 0.98 | 0.2 | — | — | 65 | — | — |
| 21 | PETA | PDA | 0.70 | 0.3 | — | — | 50 | — | — |
| 22 | PETA | PDA | 0.82 | 0.5 | 6900 | 510,000 | 70 | — | M80 |
| 23 | PETA | PDA | 0.93 | 0.5 | 12,000 | 520,000 | 80 | — | M80 |
| 24 | PETA | PDA | 1.06 | 0.5 | — | — | 65 | — | — |
| 14A | TMPTA | DAMC | 0.95 | 2 | — | 300,000 | 50 | 200 | — |
| 14B | TMPTA | PEI | 1.2 | 0.5 | — | — | 50 | 200 | — |

Examples 25-33 offer a comparison of properties of polyaminoesters formed from diacrylates to properties of polyaminoesters formed from triacrylates. The flexural strength, modulus, and thermal behavior of diacrylate polyaminoesters are unacceptable for a useful plastic.

EXAMPLES 25-33

1,2-Propylenediamine is reacted with electrophoresis grade ethylene diacrylate in various ratios by the procedure of Example 1. The only exception is that postcure acted with trimethylolpropane trimethylacrylate (16.85 parts) by the procedure of Example 1. This Example is comparative because of the methacrylate rather than acrylate. After 4 days at room temperature the solution is very viscous but not gelled. All attempts to react these at higher temperatures lead only to soft gels; no plastic articles can be made.

EXAMPLE 35

(Comparative)—2,4-Diaminotoluene (2.73 parts) is mixed with trimethylolpropane triacrylate (10.0 parts) by the procedure of Example 1. The Example is comparative because of the aromaticity of the amine. The mixture is allowed to stand at 60° C. for 16 hours. No increase in viscosity occurs. No plastic material can be made.

EXAMPLE 36

(Comparative)—n-Butylamine (5.26 parts) is added to trimethylolpropane triacrylate (14.89 parts) as in Example 1. This Example is comparative because of the amine hydrogen functionality. After 6 hours at room temperature the solution becomes viscous but gelation does not occur until 24 hours. No plastic material can be made from this combination of monomers—only rubbery gels.

Examples 37–65 illustrate the properties of polyaminoesters containing free radical initiator and unsaturated monomer.

EXAMPLE 37 m-Xylylenediamine (40.63 parts) is added to a solution of 0.40 parts di-t-butyl peroxide in pentaerythritol triacrylate (142.4 parts). The components are mixed with a glass rod and poured into the glass sheet mold. The polyaminoester is postcured by heating to 175° C. over a 1 hour period. Properties are listed in Table 4.

EXAMPLE 38 m-Xylylenediamine (34.5 parts) is added to a mixture of di-t-butyl peroxide (0.33 parts), styrene (13.8 parts), and pentaerythritol triacrylate (102.4 parts). The components are mixed with a glass rod and poured into a sheet mold. The sheet is postcured by heating to 175° C. over a 1 hour period. Its properties are shown in Table 4.

EXAMPLES 39–42 m-Xylylenediamine was added to a mixture of di-t-butyl peroxide, styrene, and pentaerythritol triacrylate as in Example 38. Properties are listed in Table 4.

EXAMPLES 43–45

PETA-XDA Polyaminoester with MMA and di-t-butyl peroxide.

m-Xylylenediamine is added to a mixture of di-t-butyl peroxide, methyl methacrylate, and pentaerythritol triacrylate as in Example 38. Properties are shown in Table 4.

EXAMPLES 46–57

Tetraethylenepentamine is reacted with a mixture of trimethylolpropane triacrylate, styrene, and di-t-butyl peroxide as in Example 38. The properties are shown in Table 5. These Examples illustrate the effect of component ratio. At ratios lower than 0.8 the addition of initiator with or without unsaturated monomer has negligible effect on the DTUFL. At very high ratios (2.0) the reaction is too slow and/or the exotherm is too high to be useful in RIM processing; also, the shrinkage would be too high for useful RIM processing. At intermediate levels, significant improvements in modulus, tensile strength, and DTUFL result by addition of initiator and unsaturated monomer.

Other amines are reacted with pentaerythritol triacrylate, styrene, and di-t-butyl peroxide as in Example 38. Properties are shown in Table 6. Styrene in excess of about 15% leads to cracking of the plastic.

Examples 66 and 67 illustrate the incorporation of filler and glass fiber.

EXAMPLE 66

Tetraethylenepentamine (16.0 parts) is added to a mixture of calcium metasilicate (28.2 parts) in di-t-butyl peroxide (0.27 parts), styrene (9.5 parts), and pentaerythritol triacrylate (80.2 parts). The components are mixed with a glass stirring rod and poured into a glass sheet mold. The sheet is postcured by heating to 175° C. over 1 hour. The plastic has a tensile modulus of 800,000 psi and a DTUFL at 264 psi of 195° C.

TABLE 4

| Example | Acrylate | Amine | Equiv. ratio Acrylate/ Amine | Initiator | Monomer | Modulus (psi) | Tensile Strength (°C.) | DTUFL @ 264 psi (°C.) | DTUFL @ 66 psi (°C.) | Rockwell Hardness |
|---|---|---|---|---|---|---|---|---|---|---|
| 16 | PETA | XDA | 1.12 | — | — | 470,000 | 14,900 | 70 | 80 | M80 |
| 22 | " | " | " | 0.2% | — | 470,000 | 11,900 | 145 | 200 | M100 |
| 18 | " | " | 0.93 | — | — | 430,000 | 9600 | 95 | — | M90 |
| 19 | " | " | " | 0.2% | 6%S | 430,000 | 9100 | 110 | — | M100 |
| 20 | " | " | " | 0.2% | 8%S | 430,000 | 7900 | 125 | 190 | M100 |
| 17 | " | " | " | 0.2% | 9%S | 470,000 | 10,400 | 150 | 190 | M105 |
| 21 | " | " | " | 0.2% | 12%S | 440,000 | 7600 | 125 | — | M100 |
| 23 | " | " | 1.12 | 0.2% | 7%MMA | 480,000 | 11,500 | 149 | 190 | M100 |
| 24 | " | " | " | 0.2% | 9%MMA | 480,000 | 10,700 | 135 | 200 | M100 |

TABLE 5

| Example | Equiv. ratio Acrylate/ Amine | Init. | Styrene % | Modulus (psi) | Tensile Strength (psi) | DTUFL @ 264 psi (°C.) | DTUFL @ 66 psi (°C.) |
|---|---|---|---|---|---|---|---|
| 46 | 0.8 | — | — | 350,000 | 7000 | 50 | — |
| 47 | " | 0.2% | — | 360,000 | 7000 | 50 | — |
| 48 | " | 0.2% | 6% | 370,000 | 8500 | 50 | — |
| 49 | " | 0.2% | 9% | 390,000 | 9500 | 60 | — |
| 50 | 1.1 | — | — | 95,000 | 3000 | 45 | 45 |
| 51 | " | 0.2% | — | 350,000 | 10,000 | 50 | 180 |
| 52 | " | 0.2% | 7% | 350,000 | 10,000 | 70 | 190 |
| 53 | " | 0.2% | 9% | 325,000 | 9800 | 80 | 190 |
| 54 | 1.3 | — | — | 30,000 | 1000 | 35 | 35 |
| 55 | " | 0.2% | — | 330,000 | 10,300 | 110 | 195 |
| 56 | " | 0.2% | 6% | 340,000 | 9500 | 95 | 220 |

TABLE 5-continued

| Example | Equiv. ratio Acrylate/Amine | Init. | Styrene % | Modulus (psi) | Tensile Strength (psi) | DTUFL @ 264 psi (°C.) | DTUFL @ 66 psi (°C.) |
| --- | --- | --- | --- | --- | --- | --- | --- |
| 57 | " | 0.2% | 8% | 330,000 | 8600 | 105 | 200 |

TABLE 6

| Example | Amine | Equiv. ratio Acrylate/Amine | % Styrene | Modulus (psi) | Flexural Strength (psi) | DTUFL @ 264 psi (°C.) | DTUFL @ 66 psi (°C.) | Rockwell Hardness |
| --- | --- | --- | --- | --- | --- | --- | --- | --- |
| 58 | PDA | 1.05 | 6 | 480,000 | 12,500 | 145 | 175 | M100 |
| 59 | TEPA | 0.86 | 9 | 400,000 | 6400 | 120 | — | M105 |
| 60 |  | 1.01 | 9 | — | — | 150 | — | M105 |
| 61 |  | 1.17 | 9 | 470,000 | 5800 | 167 | 200 | M110 |
| 62 |  | 1.29 | 9 | — | — | 170 | — | M110 |
| 63 | EDA | 1.24 | 9 | — | — | 173 | 200 | M105 |
| 64 | 1,3 PDA | 1.27 | 9 | — | — | 184 | — | M110 |
| 65 | DETA | 1.05 | 9 | — | — | 145 | — | M105 |

EXAMPLE 67

Tetraethylenepentamine (15.7 parts) is added to a mixture of glass fiber (25.9 parts) in di-t-butyl peroxide (0.29 parts), styrene (9.4 parts), and pentaerythritol triacrylate (78.4 parts). The components are mixed with a glass rod and poured into a 1.0 cm glass sheet mold. After postcure the reinforced plastic has a DTUFL at 264 psi of 200° C. and a flexural modulus of over 1,000,000 psi. The notched Izod impact strength of this material is 1.5 ft.-lb./in. compared to 0.25 ft.-lb./in. for the nonreinforced material.

Examples 68–71 describe the process as carried out in high speed production equipment.

EXAMPLE 68

A 42 g. shot of tetraethylenepentamine (1.0 part) and pentaerythritol triacrylate (2.5 parts) is metered and mixed in 1 second at 40° C. in a Cincinnati Milicron RIM machine. The mixed material is fed directly into a closed electrical insulator mold. The insulator (8 cm×2 cm×2 cm) is removed from the mold after 30 seconds and postcured. The Vicat softening point of this material was 200° C. The insulator was also very rigid, indicating utility at high load and temperature applications.

EXAMPLE 69

The composition of Example 61 is processed by the procedure of Example 68. The connector is removed from the mold within one minute. After postcure the material has a Vicat softening point of 210° C. and is also very rigid, indicating excellent use temperature and load bearing properties.

EXAMPLE 70

A composition of tetraethylenepentamine (20 parts), di-t-butylperoxide (0.2 parts), styrene (9 parts), pentaerythritol triacrylate (70 parts) and milled glass (20 parts) are processed at 40° C. in an Accuratio Systems, Inc. RIM processing Machine. The material (28 g.) is delivered directly to a gear mold. The gear (5 cm in diameter and 1.5 cm long) is removed within 1 minute and postcured. The high modulus, good impact strength, and use temperature are good for this application.

EXAMPLE 71

Example 70 is repeated with the exception that 100 parts calcium carbonate is substituted for the glass. The gear is removed from the mold within one minute.

I claim:

1. Composition comprising solid polyaminoester polymers of one or more esters of acrylic acid monomers having an average acrylate functionality of at least 2.5 and one or more low molecular weight aliphatic amines having an average amine hydrogen functionality of at least 3 and an amine hydrogen equivalent weight of less than about 100, the equivalents ratio of acrylate to amine hydrogen being about 0.5 to 2.0.

2. Compositions in accordance with claim 1, further including fibrous reinforcement.

3. Compositions in accordance with claim 1, further including inert particulate filler.

4. Compositions in accordance with claim 1, further including one or more ethylenically unsaturated monomers other than acrylates which are copolymerizable with acrylates but which react slowly or not at all with amine groups.

5. Composition of claim 1 wherein the acrylate monomer is pentaerythritol triacrylate or trimethylolpropane triacrylate and the amine is of the formula $H_2N(CH_2CH_2NH)_nH$ wherein n is 1 to 4.

6. Composition of claim 5 further including one or more monomers selected from styrene and methyl methacrylate.

7. Foams having the composition of claim 1.

8. Articles having the composition of claim 1 in the form of electrical insulator parts, distributor caps, gears, fenders, boat hulls or sheet.

9. Process for producing the polymers of claim 1 comprising introducing a mixture of the acrylate monomer and the amine monomer in a mold and allowing the mixture to react.

10. The process of claim 9 wherein the mixture is allowed to react for about 1 to 2000 sec.

11. The process of claim 9 wherein said mold is a closed mold.

12. The process of claim 9 wherein said mixture further includes a free radical catalyst and one or more ethylenically unsaturated monomers other than acrylates which are copolymerizable with acrylates but react slowly or not at all with amine groups.

13. The process of claim 9 wherein the mold is maintained at a temperature of about 0° to 200° C.

14. The process of claim 9 wherein the temperature is about 20° to 120° C.

15. The process of claim 9 further including post curing the reaction product at about 30° to 300° C. for about 1 to 22 hours.

16. The process of claim 9 further including a low boiling inert solvent which boils under the reaction conditions so as to produce foamed articles.

17. The process of claim 9 wherein there is further included a free radical initiator and the equivalents ratio is about 0.8 to 2.0.

18. The process of claim 9 wherein there is no free radical initiator present and the equivalent ratio is about 0.5 to 1.09.

* * * * *